US012479216B2

(12) United States Patent
Igarashi et al.

(10) Patent No.: US 12,479,216 B2
(45) Date of Patent: Nov. 25, 2025

(54) PRINTING APPARATUS AND CONTROL METHOD OF PRINTING APPARATUS

(71) Applicant: CANON KABUSHIKI KAISHA, Tokyo (JP)

(72) Inventors: Yuki Igarashi, Tokyo (JP); Ryu Kobayashi, Kanagawa (JP); Masato Eiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 18/544,157

(22) Filed: Dec. 18, 2023

(65) Prior Publication Data

US 2024/0198693 A1 Jun. 20, 2024

(30) Foreign Application Priority Data

Dec. 20, 2022 (JP) ................................ 2022-203297

(51) Int. Cl.
*B41J 11/00* (2006.01)

(52) U.S. Cl.
CPC ........ *B41J 11/00212* (2021.01); *B41J 11/009* (2013.01)

(58) Field of Classification Search
CPC .......................... B41J 11/00212; B41J 11/009
See application file for complete search history.

(56) References Cited

FOREIGN PATENT DOCUMENTS

JP 2017140782 A * 8/2017

* cited by examiner

*Primary Examiner* — Bradley W Thies
(74) *Attorney, Agent, or Firm* — Canon U.S.A., Inc. IP Division

(57) ABSTRACT

A printing apparatus includes a fixing unit configured to fix an image onto a printing medium by heating the printing medium on which the image is printed, a measuring unit configured to measure each of a length of the printing medium at a first temperature, a length of the printing medium after heating of the printing medium in the fixing unit at a second temperature being a glass transition point of a material of the printing medium, and a length of the printing medium after heating of the printing medium in the fixing unit at a third temperature, and a determining unit configured to determine a fixation temperature to be used for the printing medium, based on the measured lengths.

11 Claims, 15 Drawing Sheets

| PRINTING MEDIUM | SUBSTRATE | GLASS TRANSITION POINT OF MATERIAL OF SUBSTRATE[℃] | FIRST TEMPERATURE[℃] | SECOND TEMPERATURE[℃] | THIRD TEMPERATURE[℃] |
|---|---|---|---|---|---|
| VINYL CHLORIDE SHEET | PVC | 80℃ | 20℃ | 80℃ | 100℃ |
| PET FILM | PET | 70℃ | 20℃ | 70℃ | 90℃ |
| TARPAULIN | PVC | 80℃ | 20℃ | 80℃ | 100℃ |

FIG.9

| TEMPERATURE[℃] | INTER-PATTERN LENGTH[mm] | DEFORMATION AMOUNT[%] |
|---|---|---|
| 20℃ | 200.0 mm | 0.00 % |
| 80℃ | 199.8 mm | -0.10 % |
| 100℃ | 198.9 mm | -0.55 % |

FIG.11

| DEFORMATION AMOUNT AT SECOND TEMPERATURE | FOURTH TEMPERATURE[℃] |
|---|---|
| 0 %～0.1 % | SECOND TEMPERATURE+20°C |
| 0.1 %～0.2 % | SECOND TEMPERATURE+10°C |
| 0.2 %～0.3 % | SECOND TEMPERATURE-10°C |
| 0.3% OR MORE | SECOND TEMPERATURE-20°C |

FIG.14

| THICKNESS OF PRINTING MEDIUM | FIFTH TEMPERATURE[℃] |
|---|---|
| 0 μm～50 μm | 60℃ |
| 50 μm～100 μm | 80℃ |
| 100 μm OR MORE | 100℃ |

FIG.15

PRINTING APPARATUS AND CONTROL METHOD OF PRINTING APPARATUS

BACKGROUND

Field of the Disclosure

The present disclosure relates to a printing apparatus including a fixing unit configured to fix a printed image with heat and a control method of the same.

Description of the Related Art

Among printing apparatuses configured to form an image by applying ink to a printing medium, there is a printing apparatus configured to fix the image by performing a heating process on the printing medium. In such a heating process, increasing an amount of heat applied to the printing medium promotes the evaporation of a solvent included in the ink, melting of a resin, and film formation, and the image tends to be fixed more surely in a shorter time.

However, depending on the heating temperature, there may occur a case where a molecular structure of the printing medium changes and the printing medium is deformed. Accordingly, it is preferable to adjust the amount of heating to a level at which no deformation of the printing medium occurs and preferable fixation is achieved. However, such a preferable amount of heating depends on a material of the printing medium. Moreover, the heat capacity of the printing medium varies depending on the thickness or size of the printing medium, even in the case of the same material. Accordingly, the printing apparatus configured to perform heating fixation is required to optimize the heating process depending on the printing medium to be used, that is to set an optimal heating temperature for each type of printing medium.

Japanese Patent Laid-Open No. 2017-140782 (hereinafter, referred to as Literature 1) discloses a technique as follows. A deformation amount of a printing medium is measured while changing a fixation temperature stepwise to obtain the deformation amount at each step of the fixation temperature, whether the measured deformation amount has exceeded a deformation amount threshold defined in advance is determined, and the deformation amount of the printing medium with respect to temperature is predicted. Then, the fixation temperature is determined to be a temperature lower than a glass transition point at which a molecular structure of the printing medium changes.

In the case where the fixation temperature is changed stepwise as in the technique of Literature 1, there is a possibility that prediction accuracy of the deformation amount with respect to temperature decreases and the fixation temperature cannot be determined to be the optimal fixation temperature, depending on the method of measuring temperature stepwise. For example, in the case where an interval between temperatures of the respective steps is large, a difference from the optimal temperature is large. Moreover, in the case where the interval between temperatures is small but a measured temperature range is small, the optimal temperature may be outside this measured temperature range in some cases.

SUMMARY

A printing apparatus according to one aspect of the present disclosure includes a fixing unit configured to fix an image onto a printing medium by heating the printing medium on which the image is printed, a measuring unit configured to measure each of a length of the printing medium at a first temperature, a length of the printing medium after heating of the printing medium in the fixing unit at a second temperature being a glass transition point of a material of the printing medium, and a length of the printing medium after heating of the printing medium in the fixing unit at a third temperature, and a determining unit configured to determine a fixation temperature to be used for the printing medium, based on the measured lengths.

Further features of the present disclosure will become apparent from the following description of exemplary embodiments with reference to the attached drawings.

BRIEF DESCRIPTION OF THE DRAWINGS

FIG. 9 is a diagram illustrating a table of a substrate, a glass transition point of a material of the substrate, and measurement temperatures;

FIG. 11 is a diagram illustrating an example of measured inter-pattern lengths and deformation amounts;

FIG. 14 is a diagram illustrating an example of a table for determining a fourth temperature from the deformation amount at a second temperature; and FIG. 15 is a diagram illustrating an example of a table for determining a fifth temperature depending on a thickness of the printing medium.

DESCRIPTION OF THE EMBODIMENTS

Figure 1A:
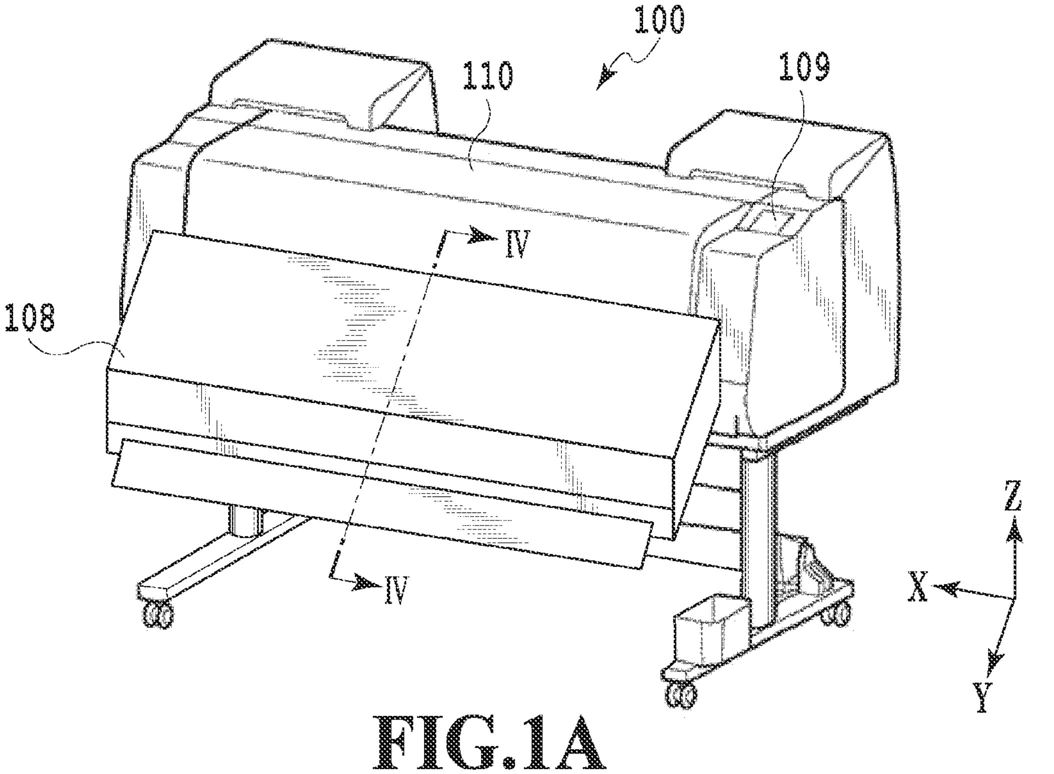
FIGS. 1A and 1B are perspective diagrams illustrating a configuration of a printing apparatus.

Embodiments of the present disclosure are described below in detail with reference to the attached drawings. Note that the following embodiments do not limit the matters of the present disclosure, and not all of the combinations of features described in the following embodiments are necessarily essential for the solving means of the present disclosure. Note that the same constituent elements are denoted by the same reference numerals.

First Embodiment

<Overall Configuration>

Figure 1B:
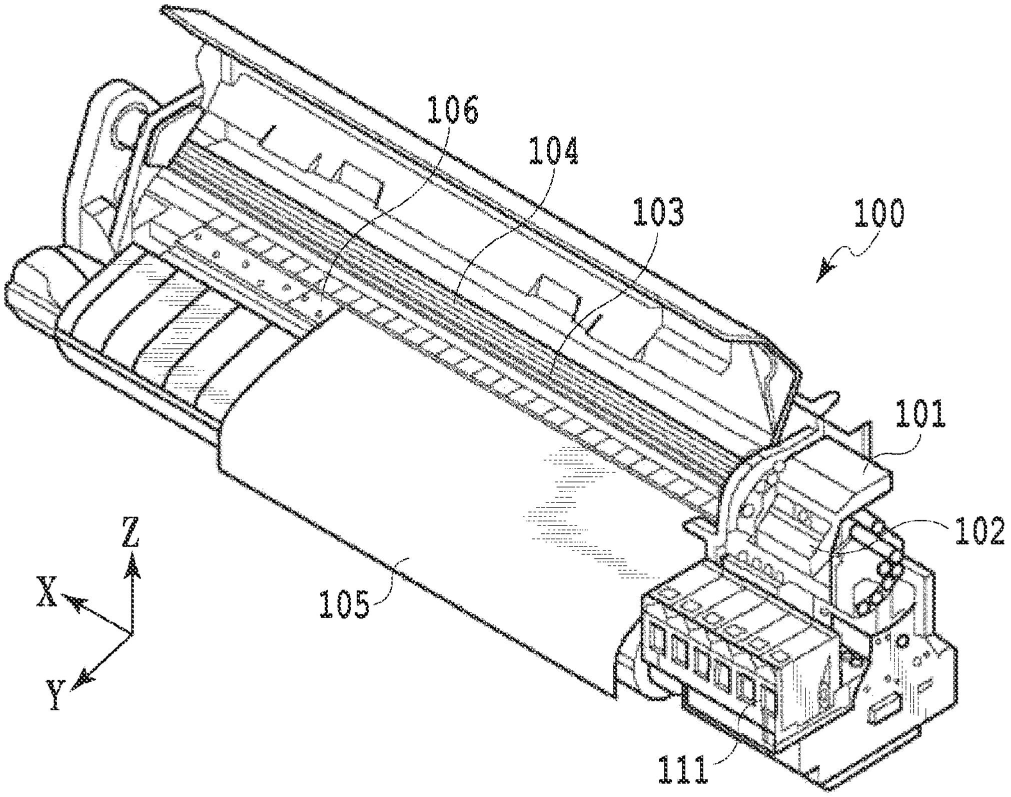

FIGS. 1A and B are perspective diagrams illustrating a configuration of a printing apparatus 100. FIG. 1A is a diagram illustrating an outer appearance of the entire printing apparatus 100. FIG. 1B is a diagram illustrating a state where an upper cover 110 in FIG. 1A is opened and an inner structure is viewable. The printing apparatus 100 in the present embodiment performs printing by applying ink droplets on a printing medium 105 as a printing agent by an inkjet printing method. The printing medium 105 is conveyed with a conveyance direction being a Y direction. A carriage 101 in which a print head 102 is mounted performs printing by reciprocally moving in an X direction intersecting the Y direction. Specifically, the printing apparatus 100 is an inkjet printing apparatus including a so-called serial type print head. However, there may be used an inkjet printing apparatus including a so-called line type print head in which nozzle arrays are formed over a print swath in the conveyance direction of the printing medium. Moreover, the printing apparatus 100 may be a multifunction peripheral in which functions such as a scan function, a FAX function, or a transmission function are integrated. Moreover, the printing apparatus 100 may be a printing apparatus of an electrophotographic method that uses a powder toner as the printing agent. In the present embodiment, a function of a process in which fixing condition setting to be described later is performed is installed in the printing apparatus 100.

The printing apparatus 100 includes an input/output unit 109 in an upper portion. The input/output unit 109 is formed of, for example, an operation panel. Specifically, the input/output unit 109 includes a display that can display an ink remaining amount, candidates of a type of printing medium, and the like. The user can select the type of the printing medium and perform setting of printing by operating keys on the operation panel.

The carriage 101 includes an optical sensor 201 (FIG. 2) and the print head 102 in which an ejection port surface provided with ejection ports for ejecting ink supplied from an ink tank 111 is formed. The carriage 101 is configured to reciprocally move in the X direction (movement direction of the carriage) along a shaft 104, by drive of a carriage motor 515 (FIG. 5) via a carriage belt 103. In the present embodiment, the printing apparatus 100 can detect reflected light from a surface of the printing medium 105 by using the optical sensor 201.

The printing medium 105, such as a roll paper, is conveyed in the Y direction on a platen 106 by a not-illustrated conveyance roller. The carriage 101 performs a printing operation by ejecting ink droplets from the print head 102 while moving in the X direction above the printing medium 105 that has been conveyed onto the platen 106 by the conveyance roller. In the case where the carriage 101 moves to an end of a printing region on the printing medium 105, the conveyance roller conveys the printing medium 105 by a certain amount, and moves the printing medium 105 to such a position that the print head 102 can perform printing on a region to be subjected to next print scanning. The above operation is repeatedly performed to print an image. The ink used in image printing in the present embodiment is a latex ink. Applying heat to the ink causes a water content to evaporate and causes a latex resin to melt and mix with a pigment, and a film is formed and cured on the printing medium surface. In the case where a general aqueous ink is used, the printing medium needs to have an ink receiving layer for catching the ink and suppressing bleeding. Meanwhile, the latex printer can perform printing on a printing medium having no ink receiving layer. In the present embodiment, the printing medium 105 subjected to printing is conveyed to a fixing unit 108. The fixing unit 108 is arranged downstream, in the Y direction (conveyance direction), of the printing region in which the print head 102 performs the printing. Heat is applied to the conveyed printing medium 105 in the fixing unit 108, and the printing medium 105 is discharged from the fixing unit 108 in a state (finished state) where the ink is cured and fixed onto the printing medium.

<Carriage Configuration>

Figure 2:
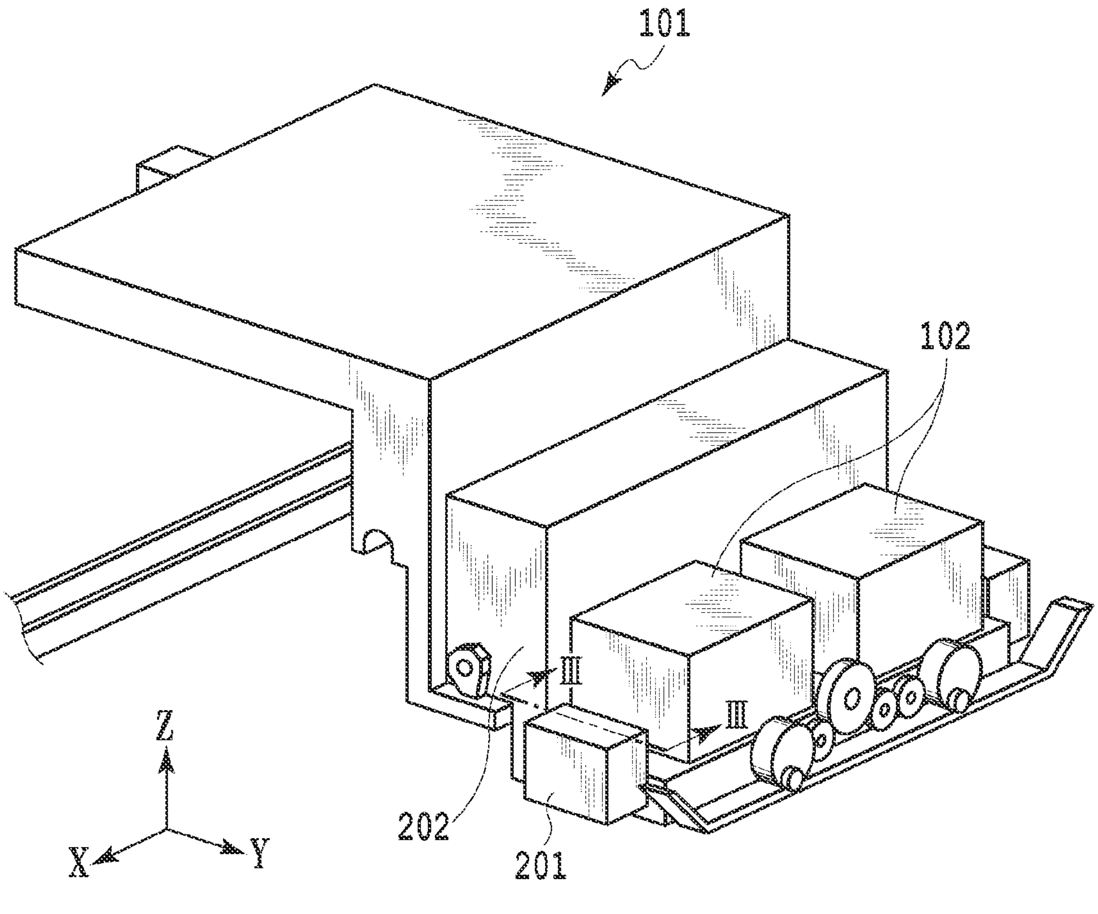
FIG. 2 is a diagram illustrating a configuration of a carriage.

FIG. 2 is a diagram illustrating a configuration of the carriage 101. The carriage 101 includes a head holder 202. The carriage 101 is a unit that can reciprocally move in the width direction (X direction) of the printing medium 105. The head holder 202 is a member that holds the print head 102 and the optical sensor 201 (being a reflective sensor). As illustrated in FIG. 2, the position of the optical sensor 201 is configured such that a bottom surface of the optical sensor is at the same position as or slightly above a bottom surface of the print head 102, so as not to come into contact with the printing medium in carriage movement.

<Optical Sensor Configuration>

Figure 3:
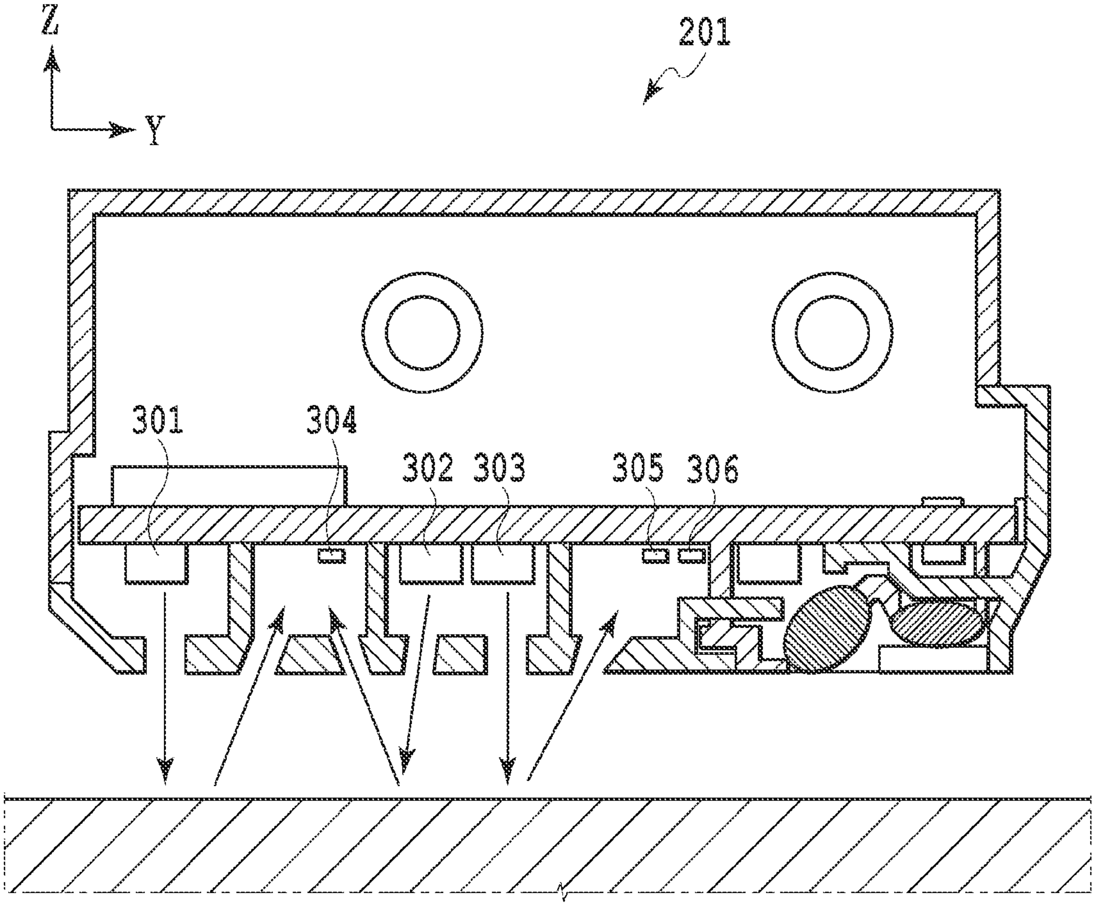
FIG. 3 is a cross-sectional schematic diagram illustrating a configuration of an optical sensor.

FIG. 3 is a cross-sectional schematic diagram illustrating a configuration of the optical sensor 201. FIG. 3 illustrates a cross section along the III-III line in FIG. 2. The optical sensor 201 includes a first LED 301, a second LED 302, a third LED 303, a first photodiode 304, a second photodiode 305, and a third photodiode 306 as optical elements. The first LED 301 is a light source having an angle of irradiation of a normal line (90°) with respect to the surface (measurement surface) of the printing medium 105. The first photodiode 304 receives reflection of light emitted from the first LED 301 and reflected on the printing medium 105, at an angle of 45° in a Z direction. Specifically, the first LED 301 and the first photodiode 304 form an optical system that detects a so-called diffuse-reflection component of the reflected light from the printing medium 105. Although the angle is not limited to 45°, the angle of 45° is preferable in consideration of robustness to fluctuation of the height of the print head 102.

The second LED 302 is a light source having an angle of irradiation of 60° in the Z direction with respect to the surface (measurement surface) of the printing medium 105. The first photodiode 304 receives reflection of light emitted from the second LED 302 and reflected on the printing medium 105, at an angle of 60° in the Z direction. Specifically, the second LED 302 and the first photodiode 304 form an optical system in which an angle of light emission and an angle of light reception are equal and that detects a so-called specular reflection component of the reflected light from the printing medium 105. Although the angle is not limited to 60°, the angle of 60° is preferable in consideration of the size of the optical sensor 201 and an SN ratio of the received light.

The third LED 303 is a light source having an angle of irradiation of a normal line (90°) with respect to the surface (measurement surface) of the printing medium 105. The second photodiode 305 and the third photodiode 306 receive reflection of light emitted from the third LED 303 and reflected on the printing medium 105. Light receiving amounts of the respective second photodiode 305 and third photodiode 306 change depending on a distance between the optical sensor 201 and the printing medium 105. The distance between the optical sensor 201 and the printing medium 105 can be thereby measured.

Although an example in which the optical sensor 201 is installed in the carriage 101 is described in the present embodiment, other configurations may be employed. For example, the optical sensor may be installed by being fixed to the printing apparatus 100. Alternatively, there may be employed a configuration in which a measurement device for measuring characteristics of the printing medium that is separate from the printing apparatus 100 is used, and the characteristics measured by the measurement device are transmitted to the printing apparatus.

<Configuration of Fixing Unit>

Figure 4:
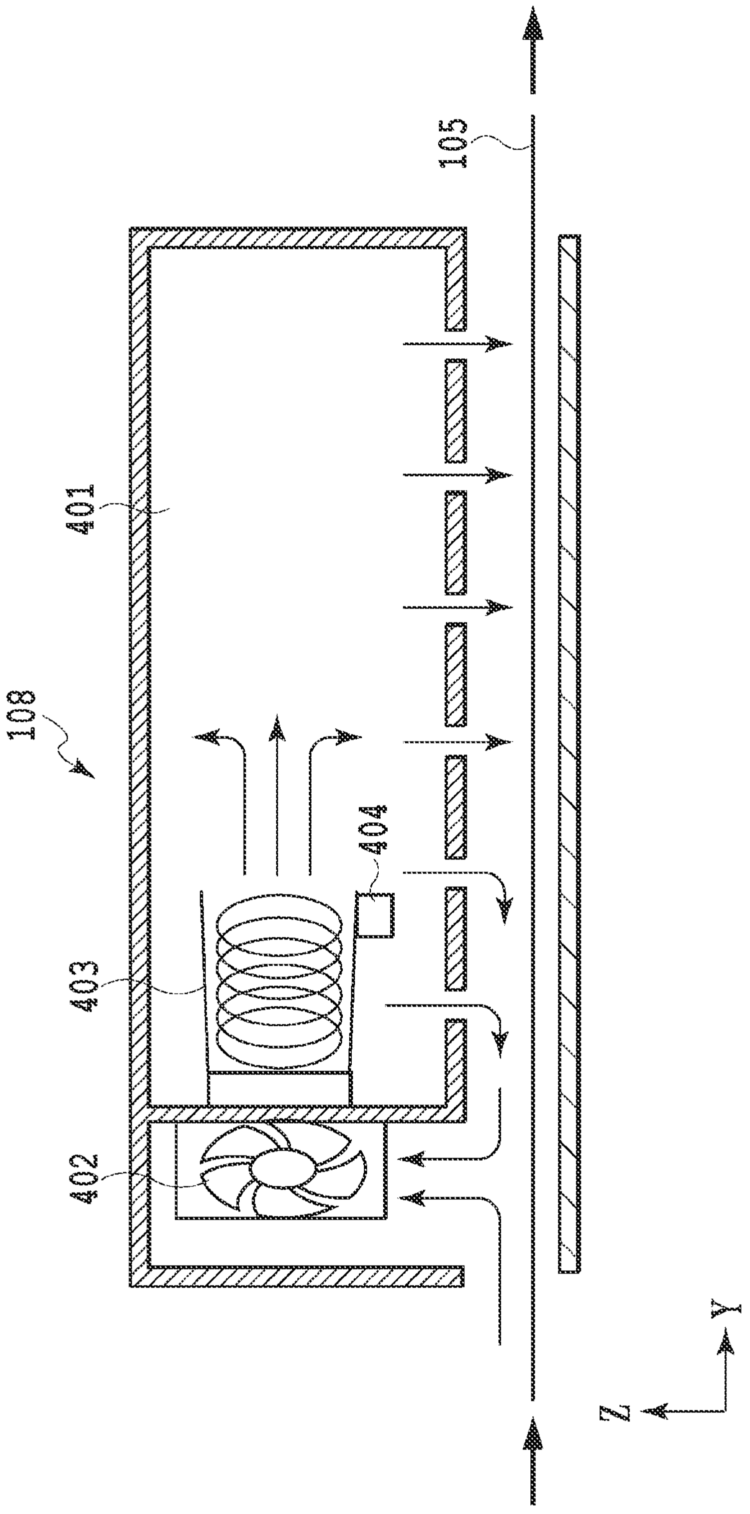
FIG. 4 is a cross-sectional schematic diagram illustrating a configuration of a fixing unit.

FIG. 4 is a cross-sectional schematic diagram illustrating a configuration of the fixing unit 108 for ink fixation. FIG. 4 illustrates a cross section along the IV-IV line in FIG. 1A. The printing medium 105 is assumed to be fed to the fixing unit 108 from the left side of FIG. 4 and discharged to the right side.

An axial-flow air blow fan 402 that takes in outside air and blows the air and a heater 403 that heats the air blown from the air blow fan 402 to turn the air to dry air are provided in a chamber 401. The dry air blown from an opening portion of the chamber 401 contributes to the fixation of the ink. The fixation temperature of the heater 403 can be changed, and is determined to be a heating temperature optimal for the target printing medium 105 based on a flowchart of determining the fixation temperature to be described later. The heater 403 includes a temperature sensor 404. Temperature feedback from the temperature sensor 404 enables more stable heater temperature control. Note that, although a non-contact ink fixing configuration using dry air and achieved by the combination of the air blow fan 402 and the heater 403 is employed in the present example, a configuration using a contact heater or a radiant heater may be employed.

<Block Diagram>

Figure 5:
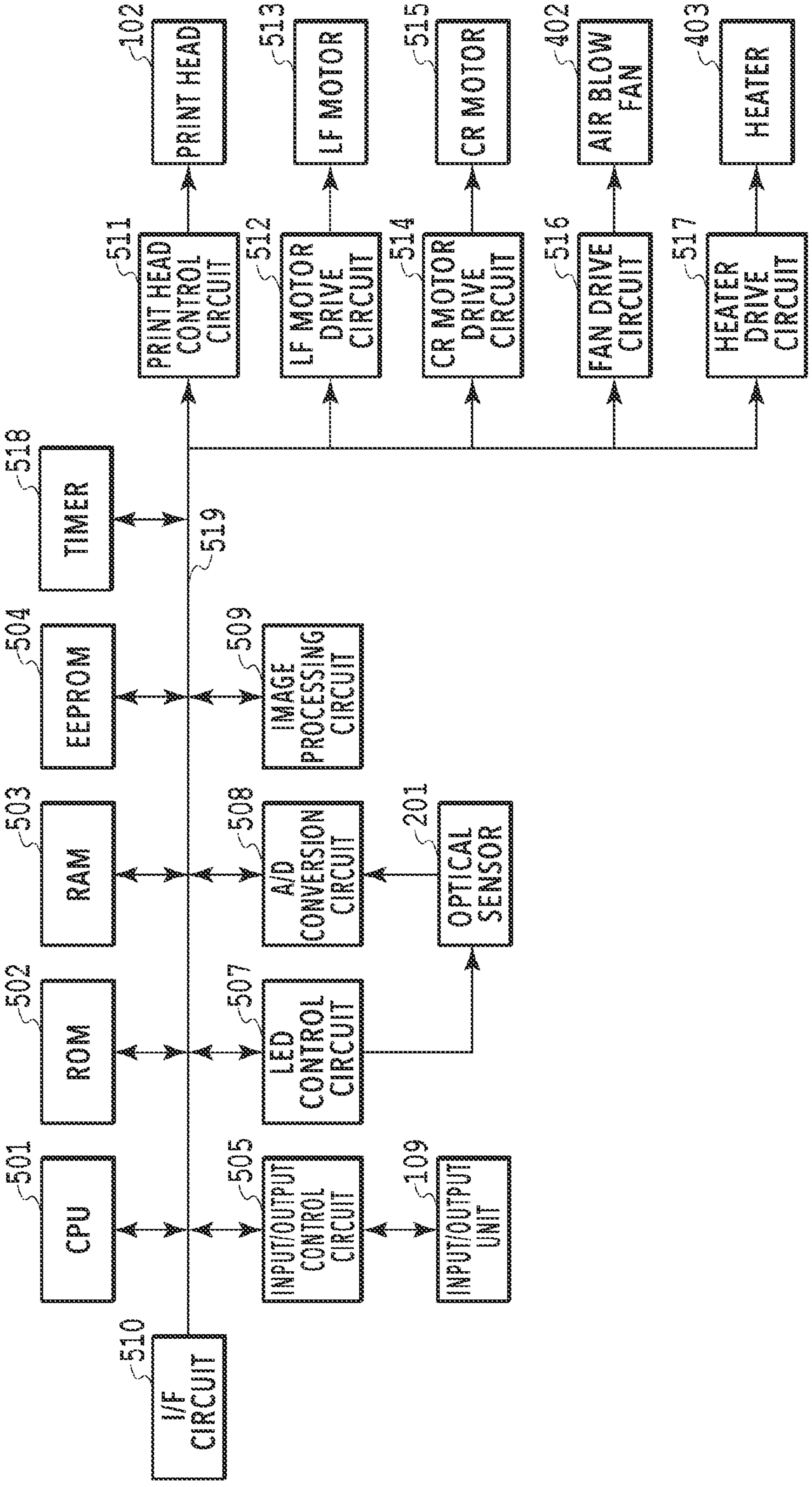
FIG. 5 is a diagram illustrating a block configuration of a control system of the printing apparatus.

FIG. 5 is a diagram illustrating a block configuration of a control system of the printing apparatus 100. A ROM 502 is a non-volatile memory, and stores, for example, a control program for controlling the printing apparatus 100 and a program for implementing operations of the present embodiment. For example, a CPU 501 implements the operations of the present embodiment by reading the program stored in the ROM 502 out to a RAM 503 and executing the program. The RAM 503 is also used as a working memory of the CPU 501. An EEPROM 504 stores data to be held even if power of the printing apparatus 100 is turned off. At least the CPU 501 and the ROM 502 implement functions as an information processing apparatus that executes processes to be described later. The EEPROM 504 stores a characteristic value, a fixing condition, and the like of each printing medium that are defined in advance. The characteristic value and the fixing condition of each printing medium may be stored in a ROM of a host computer or an external memory such as a server, instead of a storage medium in the printing apparatus 100. Moreover, the CPU 501 may perform processes using information stored outside the printing apparatus 100.

An interface (I/F) circuit 510 connects the printing apparatus 100 and an external network, such as a LAN, to each other. The printing apparatus 100 exchanges various jobs, data, and the like with an external apparatus, such as a host computer, by using the I/F circuit 510.

The input/output unit 109 includes an input unit and an output unit. The input unit receives an instruction of power on, an instruction of print execution, and an instruction of setting various functions from the user. The output unit displays various pieces of apparatus information such as a power saving mode and a setting screen of various functions that can be executed by the printing apparatus 100. In the present embodiment, the input/output unit 109 is an operation panel included in the printing apparatus 100. The input/output unit 109 is connected to a system bus 519 via an input/output control circuit 505 to be capable of exchanging data with the system bus 519. In the present embodiment, the CPU 501 performs notification control of information of the output unit.

Note that the input unit may be a keyboard of an external host computer and be capable of receiving instructions of the user from the external host computer. The output unit may be an LED display, an LCD display, or a display connected to the host apparatus. Moreover, in the case where the input/output unit is a touch panel, the input/output unit can receive instructions from the user through software keys. Moreover, the input/output unit 109 may be formed of a speaker and a microphone and be configured such that an input from the user is a voice input and notification to the user is a voice output.

In the case where the measurement by the optical sensor 201 is to be executed, the CPU 501 drives an LED control circuit 507 to perform control such that a predetermined LED in the optical sensor 201 is turned on. Each of the photodiodes in the optical sensor 201 outputs a signal corresponding to the received light, an A/D conversion circuit 508 converts the signal to a digital signal, and the digital signal is temporarily saved in the RAM 503. Data to be saved also during power off of the printing apparatus 100 is stored in the EEPROM 504.

A print head control circuit 511 supplies a drive signal corresponding to print data to a nozzle drive circuit including a selector and a switch mounted in the print head 102, and performs control of a printing operation of the print head 102 such as drive order of nozzles. For example, in the case where print target data is transmitted from the outside to the I/F circuit 510, the print target data is temporarily saved in the RAM 503. Then, the print head control circuit 511 drives the print head 102 based on print data obtained by converting the print target data to print data for printing. In this case, a line feed (LF) motor drive circuit 512 drives an LF motor 513 based on a bandwidth of the print data or the like, and rotates the conveyance roller connected to the LF motor 513 to convey the printing medium 105. A carriage (CR) motor drive circuit 514 drives a carriage (CR) motor 515 to perform scanning of the carriage 101 via the carriage belt 103.

Data sent from the I/F circuit 510 includes not only the print target data but also data on contents set in a printer driver. Moreover, for example, the print target data is received from the outside via the I/F circuit 510 and stored in a storage unit such as the RAM 503, or is stored in advance in a storage unit such as a hard disk drive in some cases. The CPU 501 reads image data from the storage unit and controls an image processing circuit 509 to perform conversion (binarization process) of the image data to the print data for using the print head 102. The image processing circuit 509 executes various image processes such as color space conversion, HV conversion, gamma correction, and rotation of an image, in addition to the binarization process.

A fan drive circuit 516 controls the air blow amount from the air blow fan 402 by controlling the number of revolutions of the air blow fan 402. A heater drive circuit 517 performs temperature control of the heater 403 based on heating temperature setting information from the CPU 501 and the temperature feedback from the temperature sensor 404 installed near the heater 403. A timer 518 measures heating time by the fixing unit.

<Printing Medium>

In this section, a printing medium used in the field of sign display is briefly described. In a production step of a polymer film to be the printing medium, a process referred to as drawing in which the film is stretched in a certain direction is generally performed. In this case, a characteristic crystallization referred to as orientated crystallization occurs due to aligning of molecules of the film in a certain direction, and a unique structure referred to as fiber structure is formed. Such a fiber structure is in a state where entropy is suppressed to a low level at ambient temperature. However, in the case where the temperature exceeds a temperature referred to as glass transition point, the entropy increases, and amorphous molecules become movable. As a result, contraction due to entropic elasticity (rubber elasticity) occurs, and this causes deformation and stiffness change of the film. In a printing medium with a glass transition point lower than a heating temperature range of the fixing unit 108, deformation tends to occur even in the case where the heating temperature is set to a minimum temperature.

A general temperature of a glass transition point of each of materials is known. However, the printing medium used in the field of sign display has a laminar structure obtained by combining multiple materials, and a glass transition point of the printing medium is generally not known.

Figure 6A:
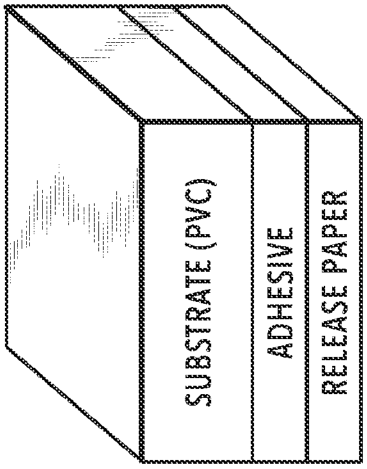
FIGS. 6A to 6C are schematic diagrams explaining structures of printing media.
Figure 6B:
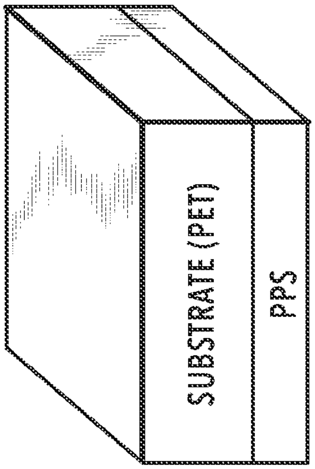
Figure 6C:
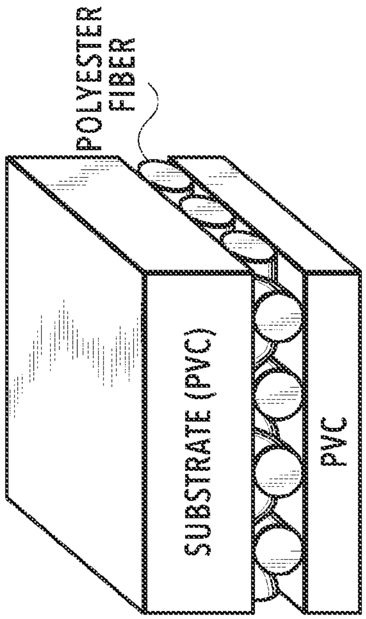

FIGS. 6A to 6C are schematic diagrams explaining structures of printing media. FIG. 6A is an example of a vinyl chloride sheet, and the sheet has a three-layer structure. In FIG. 6A, the sheet has a structure in which release paper, adhesive, and polyvinyl chloride (PVC) being a substrate are stacked one on top of the other. FIG. 6B is an example of a polyethylene terephthalate (PET) sheet, and the sheet has a two-layer structure of polyphenylene sulfide (PPS) and PET being a substrate. FIG. 6C is an example of a tarpaulin, and the tarpaulin has a three-layer structure of PVC, polyester fiber, and PVC being a substrate.

<Flow in Fixation Temperature Determination>

Figure 7A:
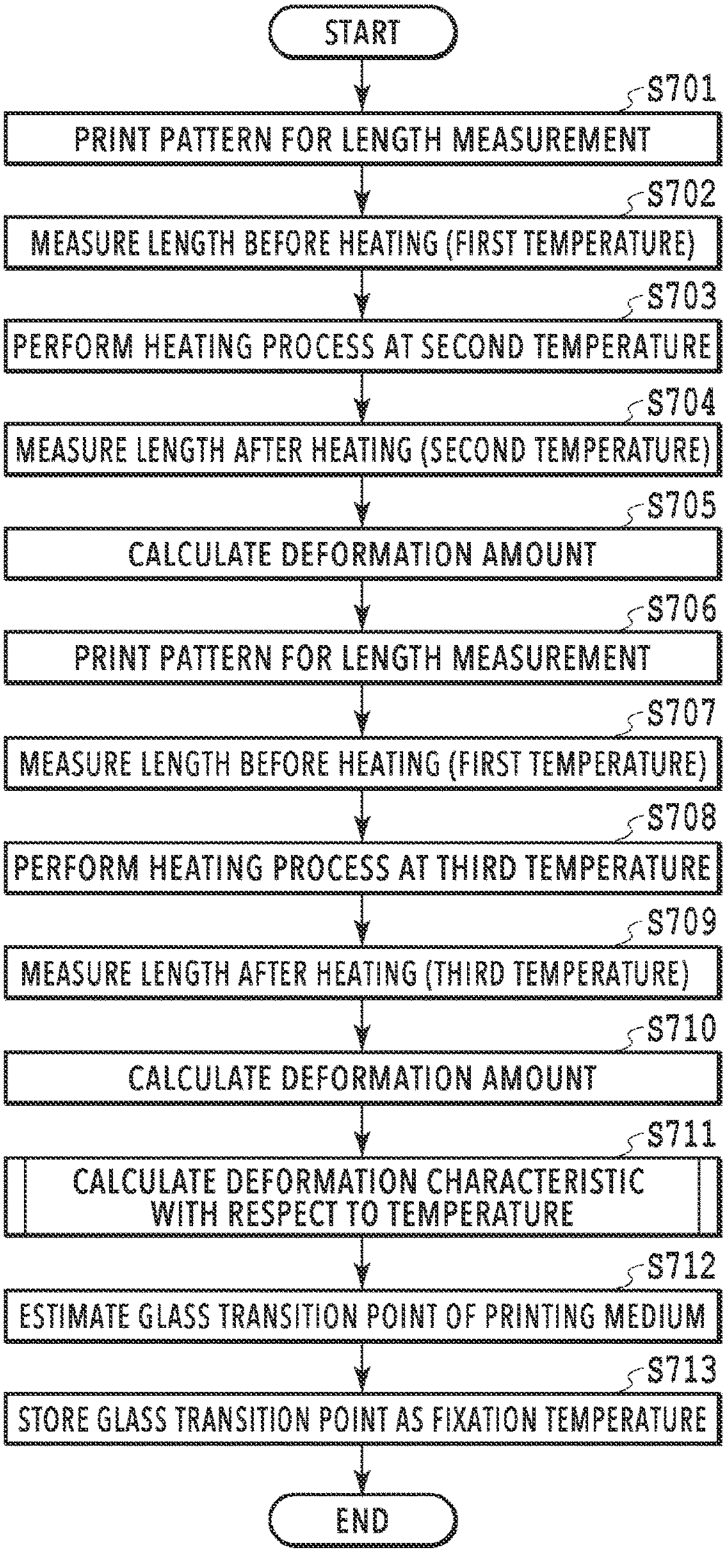
FIGS. 7A and 7B are diagrams illustrating flowcharts of a process of determining a fixation temperature of the printing medium.
Figure 7B:
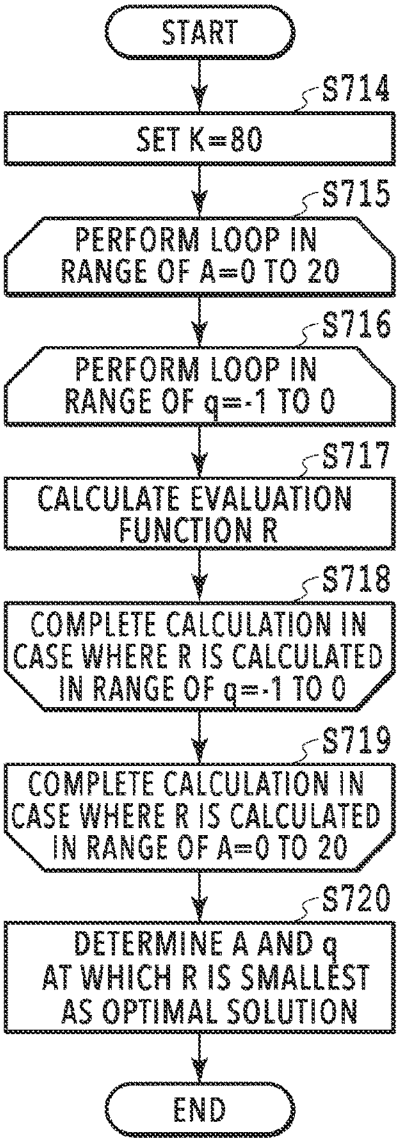

FIGS. 7A and 7B are diagrams illustrating flowcharts of a process of determining the fixation temperature of the printing medium in the present embodiment. The CPU 501 implements the process illustrated in FIGS. 7A and 7B by loading a program stored in the ROM 502 onto the RAM 503 and executing the program. Note that some or all of functions of the steps in FIGS. 7A and 7B may be implemented by hardware such as an ASIC or an electronic circuit. Sign "S" in the description of each process means step in the flowcharts of FIGS. 7A and 7B (the same applies to the following flowcharts in the present description).

As described above, the printing medium has such a characteristic that the glass transition point varies depending on the type of the printing medium, and thus a deformation amount with respect to temperature varies. Accordingly, in the case where the user uses an unknown printing medium, the optimal fixation temperature needs to be determined in consideration of the deformation amount and the fixation temperature. In the present embodiment, description is given of an example in which the optimal fixation temperature is automatically derived by the process illustrated in FIGS. 7A and 7B. The process of FIG. 7A is executed in the case where the user sets the printing medium 105 in the printing apparatus 100, and inputs an instruction of determining the fixation temperature through the input/output unit 109.

In S701, the CPU 501 prints a pattern for length measurement on the set printing medium 105.

Figure 8:
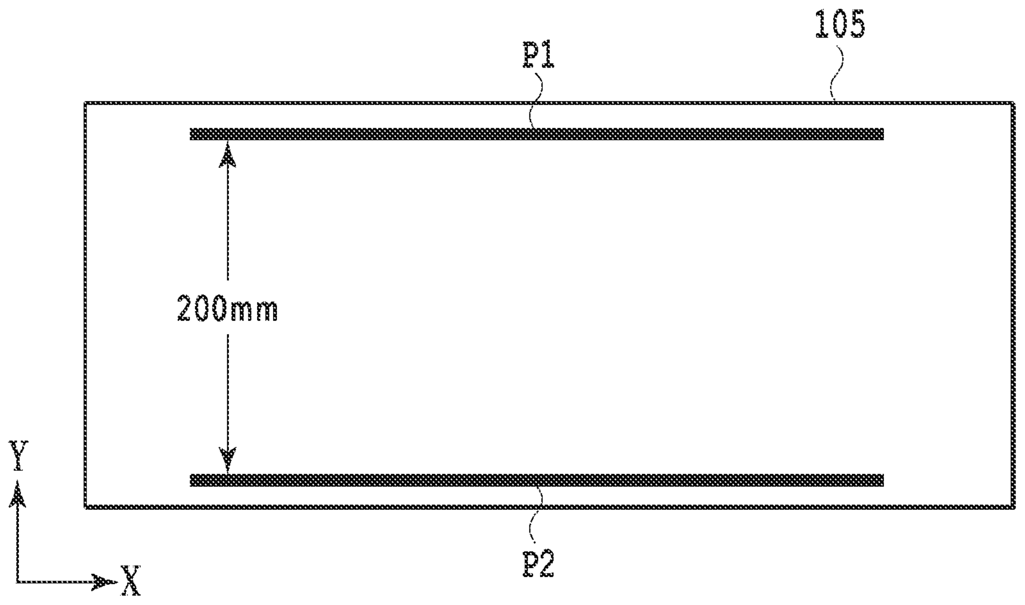
FIG. 8 is a diagram illustrating an example of a pattern for measuring a length of the printing medium.

FIG. 8 is a diagram illustrating an example of the pattern for measuring the length of the printing medium. In the present example, two patterns of a first pattern P1 and a second pattern P2 that extend in the X direction (width direction of the printing medium 105) are printed as the pattern for length measurement. These patterns are assumed to be patterns with a fixed interval length (200 mm in FIG. 8) in the Y direction (conveyance direction of the printing medium 105) of the printing apparatus 100. As described later, an inter-pattern length of the patterns with this fixed interval length is measured to calculate the deformation amount of the printing medium 105.

In S702, after the printing of the patterns, the CPU 501 measures the inter-pattern length before heating (first temperature) by using the optical sensor 201. In the measurement of the length, light is emitted from the first LED 301 at an angle of 90° in the Z direction, and reflected light from the patterns on the printing medium 105 is received at an angle of 45° in the Z direction to detect a diffuse-reflection component. The CPU 501 detects the first pattern P1 on the downstream side and the second pattern P2 on the upstream side with the optical sensor 201 while conveying the printing medium 105 in the conveyance direction (Y direction). Then, the CPU 501 obtains a conveyance amount in a period from the detection of the first pattern P1 on the downstream side to the detection of the second pattern P2 on the upstream side, from a difference between encoder positions at time points of detection of the respective patterns. Then, the CPU 501 measures the inter-pattern length from the obtained conveyance amount.

FIG. 9 is a diagram illustrating a table of a substrate, a glass transition point of a material of the substrate, and measurement temperatures for each printing medium. In the present embodiment, a first temperature is defined for each printing medium as illustrated in FIG. 9. In this example, the ambient temperature is assumed to be 20° C., and the first temperature being the temperature before the heating is specified as 20° C.

Returning to the description of FIGS. 7A and 7B, in the case where the measurement of the length before the heating is completed, in S703, the CPU 501 performs a heating process on the printing medium 105 at a predetermined temperature (second temperature). In the case where the fixation is completed by the heating process, in S704, the CPU 501 conveys the printing medium in the −Y direction to a position directly below the optical sensor 201, and measures the inter-pattern length as in the measurement before the heating. Specifically, the CPU 501 measures the inter-pattern length after the heating (second temperature). Next, in S705, the CPU 501 calculates the deformation amount of the printing medium 105 from before to after the heating, with the inter-pattern length before the heating being a reference. Note that the second temperature is defined as the temperature of the glass transition point of the printing medium material as described in the table illustrated in FIG. 9. In this case, the printing medium material is a substance of the substrate or the like being a main constituent of the printing medium.

Next, in S706, the CPU 501 prints the patterns for length measurement again on the printing medium 105. The patterns are printed in a region of the printing medium 105 that is not subjected to the heating process in the fixing unit 108. After the pattern printing, in S707, the CPU 501 measures the inter-pattern length before heating (first temperature) with the optical sensor 201. S707 is the same process as S702.

After the measurement of the length before the heating is completed, in S708, the CPU 501 performs the heating process on the printing medium 105 at a predetermined temperature (third temperature). After the completion of the fixation by the heating process, in S709, the CPU 501 conveys the printing medium in the −Y direction to the position directly below the optical sensor 201 as in S704, and measures the inter-pattern length as in the measurement before the heating. Specifically, the CPU 501 measures the inter-pattern length after the heating (third temperature). Next, in S710, the CPU 501 calculates the deformation amount of the printing medium 105 from before to after the heating, with the inter-pattern length before the heating being a reference. Note that the third temperature is set to a temperature higher than the second temperature as described in the table illustrated in FIG. 9. In the present example, the third temperature is defined as a temperature higher than the second temperature by 20° C.

In this example, the three temperatures of the first temperature, the second temperature, and the third temperature are assumed to be within a settable temperature range of the fixing unit 108. In the present embodiment, the temperatures for each type of printing medium are assumed to be stored as a table as illustrated in FIG. 9.

Figure 10A:
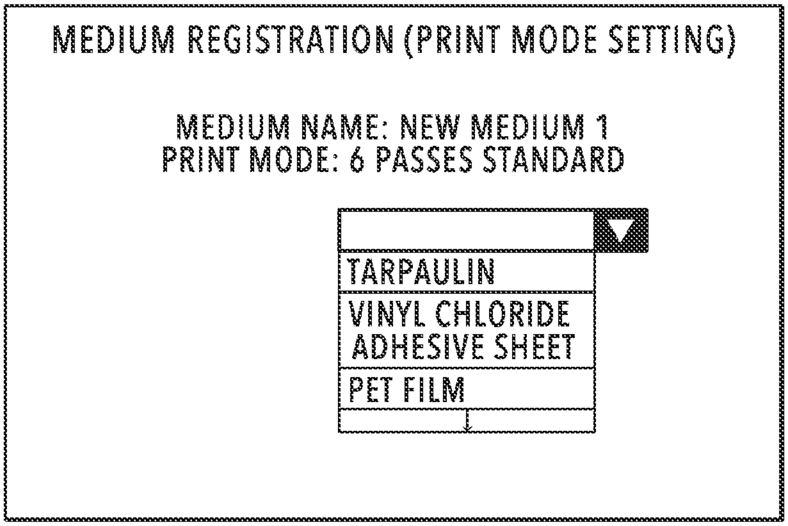
FIGS. 10A to 10C are diagrams illustrating examples of a setting screen in which the user can be perform setting.
Figure 10B:
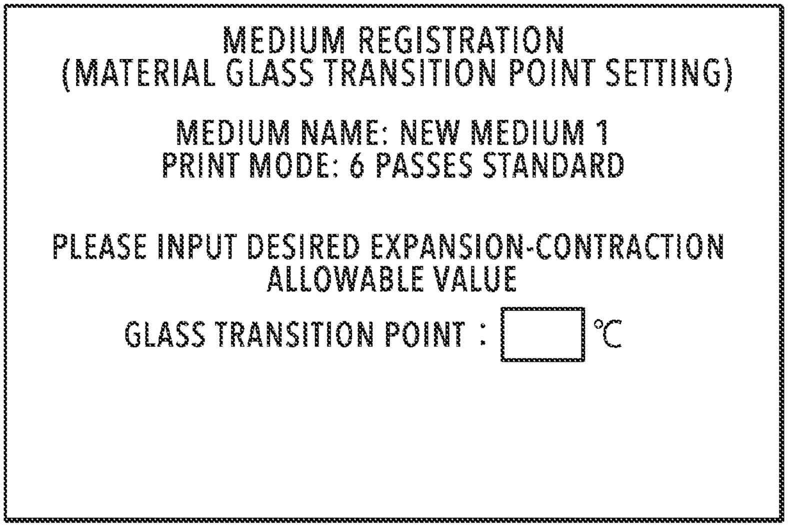
Figure 10C:
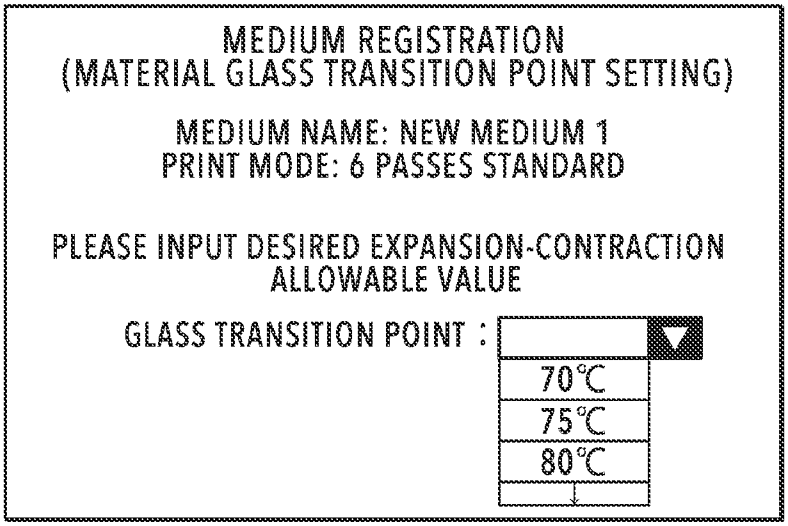

FIGS. 10A to 10C are diagrams illustrating examples of a setting screen in which the user can perform setting before execution of the flowcharts of FIGS. 7A and 7B. As illustrated in FIG. 10A, the user selects the type of the printing medium to be newly added from a pull-down menu by using the input/output unit 109. Then, the CPU 501 reads the table that is illustrated in FIG. 9 and that is stored in advance in the EEPROM 504 for each type of printing medium, and sets the three temperatures. Note that, as described above, the first temperature can be set to the ambient temperature (environment temperature), and the third temperature can be set to a temperature obtained from the second temperature. Accordingly, the configuration may be such that setting of the three temperatures is achieved by direct input of the second temperature by the user. FIG. 10B illustrates an example in which the user directly inputs the glass transition point of the material of the printing medium substrate. FIG. 10C similarly illustrates an example in which the user can select the glass transition point of the material of the printing medium substrate from a pull-down menu. The value inputted in FIG. 10B or the value selected in FIG. 10C is set as the second temperature.

Note that, in the present embodiment, description is given assuming that the inter-pattern length of the patterns printed on the printing medium 105 is 200 mm in the example of FIG. 8. However, the inter-pattern length is not limited to this length. The longer the inter-pattern length is, the higher the calculation accuracy of the deformation amount is, but the larger the consumption of the printing medium is. Accordingly, the inter-pattern length is preferably set to an appropriate length. In the present embodiment, the target of the calculation accuracy of the deformation amount is 0.1% or less. In this case, if an accuracy of an edge detection function of the optical sensor 201 is ±0.1 mm, setting the inter-pattern length of the patterns to be printed to 200 mm enables calculation of the deformation amount at an accuracy of 0.05%. Accordingly, the inter-pattern length is set to 200 mm. In any case, it is only necessary that the inter-pattern length of the printing medium 105 can be measured.

In the processes up to S710, the deformation amounts of the printing medium 105 at a total of three temperatures including the first temperature, the second temperature, and the third temperature are calculated. Note that, assuming that the deformation amount (S702) at the first temperature is referred to a first deformation amount for the sake of convenience, a second deformation amount (S705) from the first temperature to the second temperature and a third deformation amount (S710) from the first temperature to the third temperature are calculated.

FIG. 11 is a diagram illustrating an example of the measured inter-pattern lengths and the deformation amounts obtained in the processes up to S710. An example of the calculation of the deformation amounts corresponding to the three temperatures illustrated in FIG. 11 illustrates an example in which the ambient temperature (first temperatures) before the heating is 20° C., the first heating process is executed at 80° C., and the second heating process is executed at 100° C. increased by 20° C. from the temperature in the first heating process. Accordingly, in the case of FIG. 8, the deformation amounts of the printing medium 105 at 20° C., 80° C., and 100° C. are calculated at an accuracy of 0.05% with the inter-pattern length at 20° ° C. being the reference.

Next, in S711, the CPU 501 calculates a deformation characteristic of the printing medium 105 with respect to temperature based on the deformation amounts at the three temperatures calculated up to this point. FIG. 7B is a flowchart illustrating a detailed process of S711. The process of FIG. 7B is a process of calculating coefficients A, q, and K of Formula 1, which is an approximation of a characteristic of the deformation amount of the printing medium with respect to temperature, the printing medium being a medium that is used in the field of sign display and in which contraction due to entropic elasticity occurs in the case where the temperature exceeds the temperature referred to as the glass transition point.

$$\Delta L = q \cdot \left(\frac{\Delta T}{K}\right)^A \qquad \text{Formula 1}$$

In Formula 1, ΔL means the deformation amount and ΔT means an amount of change in temperature. Moreover, the coefficient A represents deformability due to temperature, and the coefficient q and the coefficient K represent the magnitude of the deformation amount due to temperature. Accordingly, the deformation characteristic of each type of printing medium with respect to temperature can be defined by using the values of the coefficients A, q, and K.

In the present embodiment, in the case where the sub-flow of S711 is started, in S714, the CPU 501 first sets K=80. This setting is made due to the following reason. The magnitude of the deformation amount is determined by a combination of the coefficient q and the coefficient K. Due to this relationship, the deformation characteristic of the printing medium 105 with respect to temperature can be calculated by using the coefficients A and q even in the case where the coefficient K is fixed to a certain value. As illustrated in S715, S716, S718, and S719, the CPU 501 executes a flow of a double loop in which an evaluation function R of Formula 2 is calculated in ranges of A=0 to 20 and q=−1 to 0. In S715, the CPU 501 changes the value of A in the range of A=0 to 20, and in S716, changes the value of q in the range q=−1 to 0 in the changing of the value of A to calculate the evaluation function R in S717. Specifically, the CPU 501 repeats the calculation of the evaluation function R in the ranges of A=0 to 20 and q=−1 to 0.

$$R = \sqrt{\frac{1}{3}\sum_{k=0}^{2}(\Delta L_k - \Delta L_k')^2} \qquad \text{Formula 2}$$

The evaluation function R is a root means square (RMS) of a difference between the calculation value ΔL of the deformation amount of Formula 1 and the deformation amount ΔL' calculated from the inter-pattern length in S705 or S710. The larger the value of R is, the larger the error between the deformation amount of Formula 1 and the deformation amount in S705 or S710 is. In S718 and S719, the CPU 501 calculates the evaluation function R in the range of q=−1 to 0 and A=0 to 20, and in S720, determines each of the coefficients A and q at which R is the smallest as an optimal solution. In Formula 2, the values of the above-mentioned first deformation amount ($\Delta L'_0$), the second deformation amount ($\Delta L'_1$) calculated in S705, and the third deformation amount ($\Delta L'_2$) calculated in S710 are put into $\Delta L'_K$. Note that the first deformation amount ($\Delta L'_0$) is 0. As described above, in Formula 2, the values obtained from Formula 1 by fixing the coefficient K to a certain value and changing the coefficient A and the coefficient q are put into $\Delta L_K$. Note that 0 is put into ΔT in case of $\Delta L_0$, 60 is put into ΔT in case of $\Delta L_1$, and 80 is put into ΔT in case of $\Delta L_2$. In the case where the coefficient A and the coefficient q are obtained in S720, the coefficient K is also obtained.

In the case where the coefficients A, q, and K are determined as described above, the deformation amount ΔL with respect to the temperature change ΔT can be calculated according to Formula 1 ($\Delta L = q \cdot (\Delta T/K)\hat{}A$). Accordingly, it is possible to calculate the deformation characteristic of the used printing medium with respect to temperature by performing the operation of S714 to S720.

Note that the process of calculating the deformation characteristic of the printing medium with respect to temperature described above is merely an example, and the process is not limited to this example. The method of deriving the deformation characteristic of the printing medium with respect to temperature and the initial values and the ranges in the deriving are not limited to those in the above example. The deformation characteristic may be derived by using a different formula or by applying a different algorithm. In any case, it is only necessary to find out the deformation characteristic of each type of printing medium with respect to temperature.

In the case where the process of S711 illustrated in FIG. 7B is completed, in S712, the CPU 501 estimates the glass transition point of the printing medium.

Figure 12:
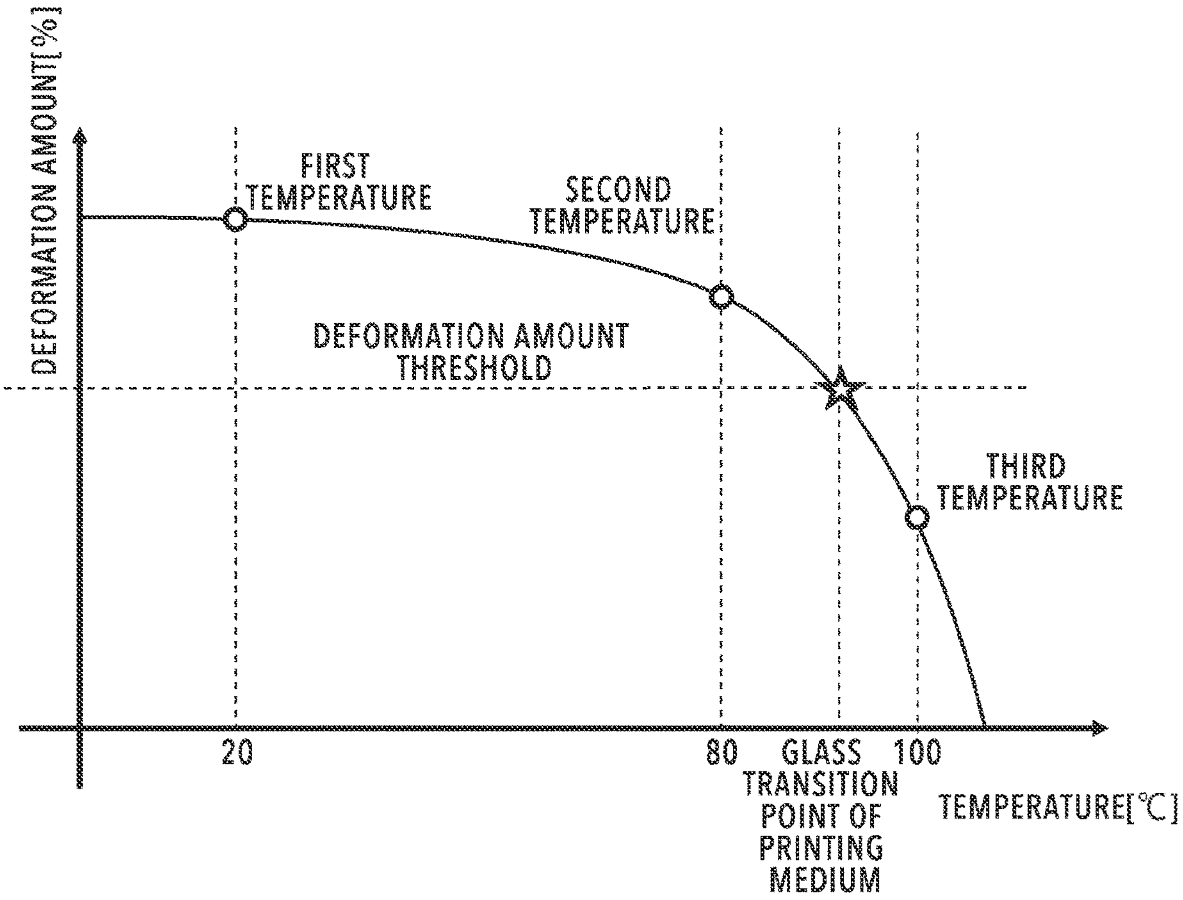
FIG. 12 is a graph illustrating the deformation amount of the printing medium with respect to temperature.

FIG. 12 is a graph illustrating the deformation amount of the printing medium with respect to temperature. The deformation characteristic of the printing medium illustrated by a graph in FIG. 12 is obtained by the calculation of S711. In the present embodiment, a deformation amount threshold is defined in advance. In S712, as illustrated in FIG. 12, the CPU 501 estimates a temperature at which the graph indicating the deformation characteristic of the printing medium 105 exceeds the deformation amount threshold for estimation of the glass transition point of the printing medium 105, as the temperature of the glass transition point of the printing medium 105. Then, in S713, the CPU 501 determines the temperature of the glass transition point estimated in S712 as the fixation temperature, and stores the temperature in the EEPROM 504.

As described above, according to the present embodiment, the optimal fixation temperature of the printing medium can be determined. Specifically, in the present embodiment, the temperatures at which the deformation amount of the printing medium is measured are determined based on the glass transition point of the printing medium material. Accordingly, the glass transition point of the printing medium can be accurately estimated in the same number of times of measurement, and a more-optimal fixation temperature can be determined.

Second Embodiment

In the first embodiment, description is given of the example in which the glass transition point of the material is used as the second temperature, and the temperature higher than the second temperature by the predetermined temperature is set as the third temperature. There may be a case where the glass transition point of the printing medium is lower than the glass transition point of the material and deformation of the printing medium has already occurred at the second temperature, depending on the type of the printing medium. The present embodiment describes an example in which the fixation temperature is appropriately determined also in such cases. Since the basic configuration is the same as that in the example described in the first embodiment, differences are mainly described.

Figure 13:
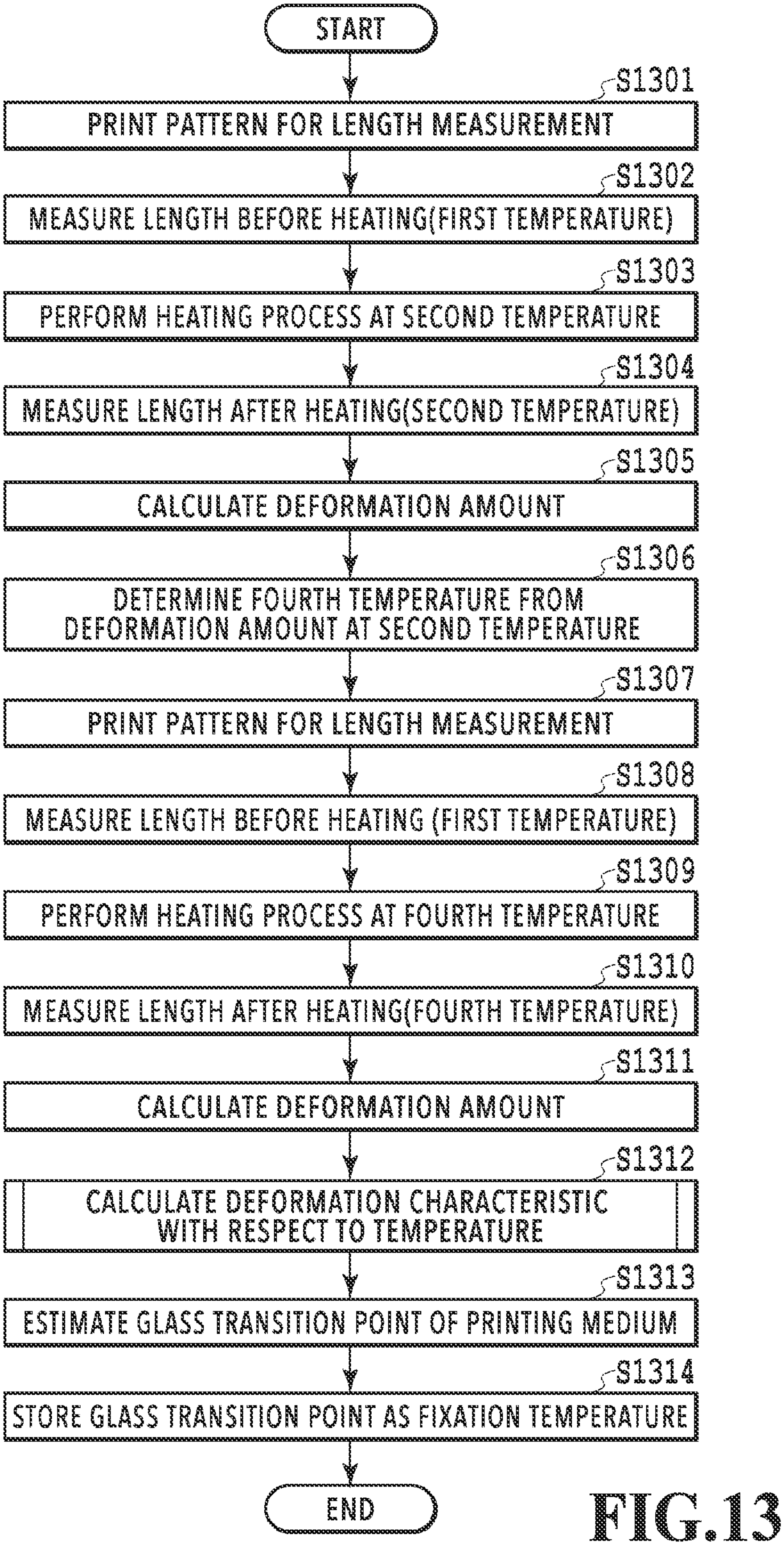
FIG. 13 is a diagram illustrating a flowchart of determining the fixation temperature.

FIG. 13 is a diagram illustrating a flowchart of determining the fixation temperature in the present embodiment. The CPU 501 implements the process illustrated in FIG. 13 by loading a program stored in the ROM 502 onto the RAM 503 and executing the program. Note that some or all of functions of the steps in FIG. 13 may be implemented by hardware such as an ASIC or an electronic circuit. As in FIG. 7A, the process of FIG. 13 is executed in the case where the user sets the printing medium 105 in the printing apparatus 100, and inputs an instruction of determining the fixation temperature through the input/output unit 109.

Processes of S1301 to S1305 are the same as the processes of S701 to S705 described in the first embodiment. In the present embodiment, in S1306, the CPU 501 determines the third temperature (hereinafter, referred to as fourth temperature for the sake of convenience) from a deformation amount (second deformation amount) calculated in S1305, that is the calculated deformation amount at the second temperature.

FIG. 14 is a diagram illustrating an example of a table for determining the fourth temperature from the deformation amount at the second temperature. As illustrated in FIG. 14, the fourth temperature is determined depending on the deformation amount of the printing medium at the second temperature. In the example of FIG. 14, in the case where the deformation amount of the printing medium at the second temperature is 0% to 0.1%, the fourth temperature is determined to be second temperature+20° C. In the case where the deformation amount is 0.1% to 0.2%, the fourth temperature is determined to be second temperature+10° C. Moreover, in the case where the deformation amount of the printing medium at the second temperature is 0.2% to 0.3%, the fourth temperature is determined to be second temperature−10° C. In the case where the deformation amount is 0.3% or more, the fourth temperature is determined to be second temperature−20° C. As described above, in the case where the deformation amount of the printing medium at the second temperature is larger than a predetermined amount, the glass transition point of the printing medium is lower than the glass transition point of the material, and thus a temperature lower than the second temperature is set as the fourth temperature.

FIG. 15 is a diagram illustrating an example of a table for determining the third temperature (hereinafter referred to as fifth temperature for sake of convenience) depending on the thickness of the printing medium. In S1306, the CPU 501 may determine the fifth temperature as the third temperature, instead of the fourth temperature. Specifically, the CPU 501 may determine the fifth temperature depending on the thickness of the printing medium according to the table illustrated in FIG. 15, and determine the fifth temperature instead of the fourth temperature. In the case where the thickness of the printing medium is large, the heat capacity of the printing medium is large, and high temperature is required for deformation. Accordingly, the larger the thickness of the printing medium is, the higher the fifth temperature is set. To the contrary, in the case where the thickness of the printing medium is small, the heat capacity of the printing medium is small, and the printing medium deforms at a low temperature. Accordingly, the fifth temperature is set low. The table of FIG. 15 is a table of such a relationship. In the case where the fifth temperature is used, in S1306, the CPU 501 performs a process of determining the fifth temperature depending on the thickness of the printing medium.

The rest of the process of FIG. 13 is described. Note that FIG. 13 illustrates the flowchart in the case where the fourth temperature is assumed to be used. Processes of S1307 and S1308 are the same as the processes of S706 and S707. In S1309, the CPU 501 performs the heating process on the printing medium 105 at the predetermined temperature (third temperature, that is the fourth temperature or the fifth temperature). In the case where the fixation is completed by the heating process, in S1310, the CPU 501 conveys the printing medium in the −Y direction to the position directly below the optical sensor 201, and measures the inter-pattern length as in the measurement before the heating. Specifically, the CPU 501 measures the inter-pattern length after the heating (fourth temperature or fifth temperature). Next, in S1311, the CPU 501 calculates the deformation amount of the printing medium 105 from before to after the heating, with the inter-pattern length before the heating being a reference. In the processes up to this point, the deformation amounts of the printing medium 105 at a total of three temperatures including the first temperature, the second temperature, and one of the fourth temperature and the fifth temperature are calculated.

In S1312, the CPU 501 calculates the deformation characteristic of the printing medium 105 with respect to temperature based on the calculated deformation amounts at the three temperatures. This process is the same as the process of FIG. 7B described in the first embodiment.

In the case where the process of S1312 is completed, in S1313, the CPU 501 estimates a temperature at which the deformation characteristic exceeds the deformation amount threshold for estimation of the glass transition point of the printing medium 105, as the temperature of the glass transition point of the printing medium. Then, in S1314, the CPU 501 determines the estimated temperature of the glass transition point as the fixation temperature, and stores the fixation temperature in the EEPROM 504.

As described above, according to the present embodiment, the process of determining the temperatures at which the deformation amount of the printing medium is measured is performed based on the deformation amount at the glass transition point of the printing medium material. It is thereby possible to accurately estimate the glass transition point of the printing medium in the same number of times of measurement and determine a more-optimal fixation temperature also in the case where the glass transition point of the printing medium is lower than the glass transition point of the material and the deformation of the printing medium has already occurred at the second temperature. Moreover, it is possible to accurately estimate the glass transition point of the printing medium in the same number of times of measurement and determine a more-optimal fixation temperature also in the case where the temperature at which the deformation amount of the printing medium is measured is determined depending on the thickness of the printing medium.

Other Embodiments

Although the example in which the process of determining the fixation temperature of the printing medium to be used in the printing is performed in the printing apparatus configured to print the user image is described in the above embodiments, the present disclosure is not limited to this. The printing operation of the user image on the printing medium may be performed in an apparatus separate from the printing apparatus in which the process of determining the fixation temperature is performed. Specifically, the form may be such that the above process is performed in a fixation temperature determination apparatus configured to determine the fixation temperature, and the determined fixation temperature is transmitted to another printing apparatus or an external apparatus such as a server.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-203297, filed Dec. 20, 2022 which is hereby incorporated by reference wherein in its entirety.

What is claimed is:

1. A printing apparatus comprising:

a fixing unit configured to fix an image onto a printing medium by heating the printing medium on which the image is printed;

a measuring unit configured to measure each of a length of the printing medium at a first temperature, a length of the printing medium after heating of the printing medium in the fixing unit at a second temperature being a glass transition point of a material of the printing medium, and a length of the printing medium after heating of the printing medium in the fixing unit at a third temperature; and a determining unit configured to determine a fixation temperature to be used for the printing medium, based on the measured lengths.

2. The printing apparatus according to claim 1, further comprising a deriving unit configured to derive a characteristic of a deformation amount of the printing medium for a temperature range including three temperatures of the first temperature, the second temperature, and the third temperature of the printing medium, based on the measured lengths, wherein the determining unit determines the fixation temperature to be used for the printing medium, based on the derived characteristic of the deformation amount of the printing medium.

3. The printing apparatus according to claim 1, wherein the first temperature is a ambient temperature, and a length of the printing medium at the first temperature is a length of the printing medium before the heating by the fixing unit.

4. The printing apparatus according to claim 3, wherein the first temperature is lower than the second temperature, and the third temperature is higher than the second temperature.

5. The printing apparatus according to claim 4, wherein the third temperature is a temperature higher than the second temperature by a predetermined temperature.

6. The printing apparatus according to claim 1, wherein the determining unit determines the third temperature depending on the measured length of the printing medium at the second temperature by the measuring unit.

7. The printing apparatus according to claim 6, wherein, in the case where a deformation amount of the printing medium determined by the measured length of the printing medium at the second temperature is larger than a predetermined amount, the third temperature is a temperature lower than the second temperature.

8. The printing apparatus according to claim 1, wherein the third temperature is determined depending on a thickness of the printing medium.

9. The printing apparatus according to claim 1, wherein the first temperature, the second temperature, and the third temperature are included in a settable temperature range of the fixing unit.

10. The printing apparatus according to claim 1, wherein the image is a pattern having a predetermined length on the printing medium, and the measuring unit measures the length of the pattern printed on the printing medium by measuring reflected light of the pattern, and thereby measures the lengths of the printing medium at the first, second and third temperatures.

11. A control method of a printing apparatus including a fixing unit configured to fix an image onto a printing medium by heating the printing medium on which the image is printed and a measuring unit configured to measure a length of the printing medium, the control method comprising:

measuring each of a length of the printing medium at a first temperature, a length of the printing medium after heating of the printing medium in the fixing unit at a second temperature being a glass transition point of a material of the printing medium, and a length of the printing medium after heating of the printing medium in the fixing unit at a third temperature with the measuring unit; and determining a fixation temperature to be used for the printing medium based on the measured lengths.

* * * * *